United States Patent [19]

Yuzawa et al.

[11] 4,257,381
[45] Mar. 24, 1981

[54] EXHAUST GAS RECIRCULATION SYSTEM CONTROLLED BY A MICROCOMPUTER FOR AN INTERNAL COMBUSTION ENGINE

[75] Inventors: Haruo Yuzawa; Tsuneomi Yano, both of Tokyo, Japan

[73] Assignee: Nissan Motor Company, Limited, Yokohama, Japan

[21] Appl. No.: 2,132

[22] Filed: Jan. 9, 1979

[30] Foreign Application Priority Data

Jan. 10, 1978 [JP] Japan .................................. 53-854

[51] Int. Cl.³ ........................ F02B 47/08; F02M 25/00
[52] U.S. Cl. ...................................... 123/571; 74/860; 74/856
[58] Field of Search ............. 123/119 A; 74/860, 856

[56] References Cited

U.S. PATENT DOCUMENTS

| | | | |
|---|---|---|---|
| 4,008,697 | 2/1977 | Konno | 123/119 A |
| 4,058,098 | 11/1977 | Onaka | 123/119 A |
| 4,142,495 | 3/1979 | Lahiff | 123/119 A |
| 4,164,032 | 8/1979 | Nohira et al. | 123/119 A |
| 4,164,207 | 8/1979 | Okitsu et al. | 123/119 A |
| 4,173,705 | 11/1979 | Toelle | 123/119 A |

*Primary Examiner*—Wendell E. Burns
*Attorney, Agent, or Firm*—Schwartz, Jeffery, Schwaab, Mack, Blumenthal & Koch

[57] ABSTRACT

Exhaust gas recirculation system controlled by a microcomputer for an internal combustion engine comprises a pressure sensor for measuring the pressure of the exhaust gas downstream of an orifice disposed in the exhaust gas recirculation passage, a microcomputer for electrically controlling an electromagnetic valve which fluidly controls an exhaust gas recirculation control valve arranged in the exhaust gas recirculation passage, in view of the comparison of an optimal pressure of the exhaust gases, derived from the engine parameters, and the actual pressure measured by the sensor. The gear position of the transmission, engine temperature, engine speed, and the intake airflow rate are used in the microcomputer to produce an output signal with which the electromagnetic valve is controlled.

11 Claims, 4 Drawing Figures

EXHAUST GAS RECIRCULATION SYSTEM CONTROLLED BY A MICROCOMPUTER FOR AN INTERNAL COMBUSTION ENGINE

FIELD OF THE INVENTION

This invention generally relates to an exhaust gas recirculation system for an internal combustion engine. More specifically, the present invention relates to such an exhaust gas recirculation system in which the recirculation rate is controlled by electrical circuitry.

BACKGROUND OF THE INVENTION

A conventional exhaust gas recirculation system is equipped with a mechanical control system in which the recirculation rate of the exhaust gas is controlled in accordance with an engine parameter such as the pressure of the exhaust gas emitted from the exhaust port of the engine. In such a conventional exhaust gas system, the recirculation rate undesirably varies when the engine operates at a low speed, while the recirculation rate is higher than required when the engine operates at a high speed with low load. Further, it is difficult to maintain the high precision and accuracy of the exhaust gas control system for a long period of time since some of the elements used in the control system are exposed to the hot exhaust gases. These drawbacks of the conventional exhaust gas recirculation system will be discussed in detail hereinlater.

SUMMARY OF THE INVENTION

The present invention has been developed in order to remove the above mentioned drawbacks of the conventional exhaust gas system. In the present invention an electromagnetic valve is employed for controlling a conventional exhaust gas recirculation control valve. An electromagnetic valve energizing signal is produced by a microcomputer in accordance with various engine parameters so that the recirculation rate of the exhaust gases is optimally determined.

It is therefore, an object of the present invention to provide an exhaust gas recirculation system in which the recirculation rate of the exhaust gases is determined to be optimal for the operational condition of the engine from low speed operation to high speed operation.

Another object of the present invention is to provide such an exhaust gas recirculation system in which the engine operation is stable.

A further object of the present invention is to provide such an exhaust gas recirculation system in which the production rate of NOx (nitrogen oxide) does not irregularly vary.

Still a further object of the present invention is to provide such an exhaust gas recirculation system in which the fuel consumption rate is decreased.

Yet a further object of the present invention is to provide such an exhaust gas recirculation system in which the flexibility of design of the exhaust gas recirculation system is increased.

An additional object of the present invention is to provide an exhaust gas recirculation system in which the precision and accuracy of the system are maintained for a long period of time.

BRIEF DESCRIPTION OF THE DRAWINGS

These and other objects and features of the present invention will become more readily apparent fom the following detailed description of the preferred embodiment of the exhaust gas recirculation system according to the present invention taken in conjunction with the accompanying drawings in which.

DETAILED DESCRIPTION OF THE PREFERRED EMBODIMENT

Prior to the description of the preferred embodiment, the construction and operation of a conventional exhaust gas recirculation system will be described hereinbelow with reference to FIG. 1.

Figure 1:
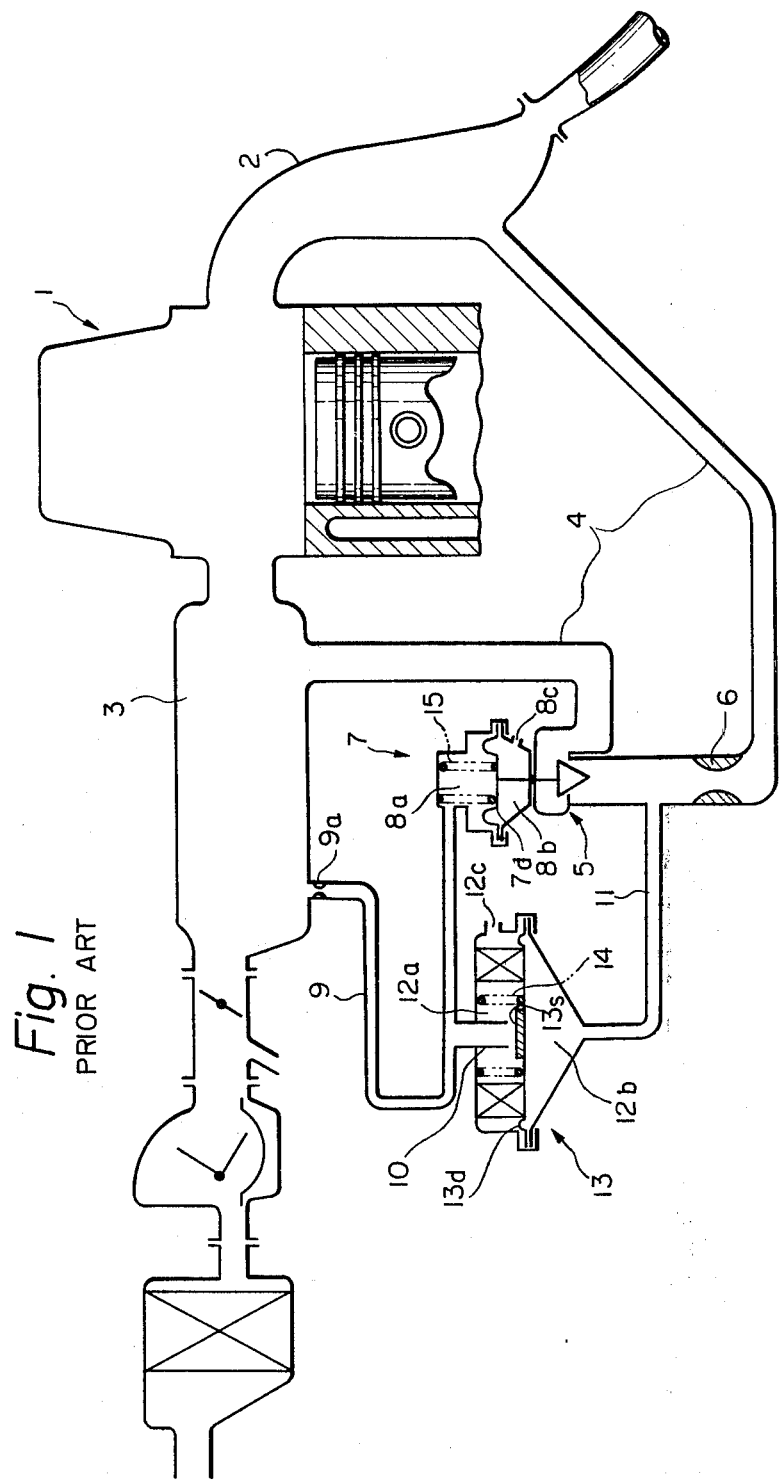
FIG. 1 shows a schematic view of a conventional exhaust gas recirculation system.

FIG. 1 illustrates a schematic view of a conventional exhaust gas recirculation, which will be referred hereinafter to as EGR, system used in an internal combustion engine. An internal combustion engine 1 is equipped with an intake manifold 3 and an exhaust pipe 2. An EGR passage 4 via which exhaust gases are recirculated into the intake manifold 3, is interposed between the exhaust gas pipe 2 and the intake manifold 3. An EGR control valve 5 is interposed in the EGR passage 4, while an orifice 6 is provided in the EGR passage 4 upstream of the EGR control valve 5. The EGR control valve 5 is operatively connected to a diaphragm assembly 7 so as to control the amount of exhaust gases to be recirculated by maintaining the pressure of the gases between the EGR control valve 5 and the orifice 6 by means of a VVT (venturi vacuum transmission) valve 13.

The diaphragm assembly 7 consists of first and second chambers 8a and 8b arranged at opposite sides with respect to a diaphragm 7d. The diaphragm 7d is biased downward in the figure, by the force of a spring 15 disposed in the first chamber 8a. The first chamber 8a is fluidly connected via a passage 9 to the intake manifold 3, while the second chamber 8b communicates with the atmospheric pressure via an opening 8c. The passage 9 connecting the intake manifold 3 and the first chamber 8a has an orifice 9a at a portion close to the intake manifold 3 for regulating the vacuum pressure prevailing in the intake manifold 3. The passage 9 is fluidly connected via a conduit 10 to a first chamber 12a of the VVT valve 13. The VVT valve 13 has a second chamber 12b at the opposite side of the first chamber 12a with respect to a diaphragm 13d. The diaphragm 13d arranged between the first and second chambers 12a and 12b is biased by the force of a spring 14 disposed in the first chamber 12a, downward in the figure. The diaphragm 13d has a valve head 13s at the center thereof. The conduit 10 extends in the first chamber 12a and has an open end which locates adjacent to the valve head 13s. Therefore, when the diaphragm moves upward in the figure, the opening of the conduit 10 is shut by the valve head 13s. The first chamber 12a of the VVT valve is communicated via an opening 12c with the atmosphere, while the second chamber 12b is fluidly connected via a passage 11 to the EGR passage 4 between the EGR control valve 5 and the orifice 6.

When the pressure of the exhaust gases downstream of the orifice 6 is below a predetermined value, the diaphragm 13d of the VVT valve 13 moves downward by the biasing force of the spring 14, thereby establishing communication between the conduit 10 and the first chamber 12a. The vacuum pressure in the passage 9 is thus diluted by the atmospheric pressure induced via the opeing 12c and the conduit 10.

Accordingly, the pressure in the first chamber 8a of the diaphragm assembly 7 approaches the atmospheric pressure and thus the diaphragm 7d tends to move downward in the figure so that the EGR control valve 5 closes interrupting the communication between the exhaust pipe 2 and the intake manifold 3. Upon closure of the EGR control valve 5, the pressure in the EGR passage 4 between the EGR control valve 5 and the orifice 6 increases. When the pressure of the exhaust gases between the EGR control valve 5 and the orifice 6 exceeds the predetermined value, the diaphragm 13d of the VVT valve 13 moves upward against the biasing force of the spring 14 so as to close the opening of the conduit 10. With this operation, the pressure in the first chamber 8a of the diaphragm assembly 7 approaches the vacuum pressure in the intake manifold 3. Consequently, the diaphragm 7d moves upward against the biasing force of the spring 15, thereby opening the EGR control valve 5. Upon opening of the EGR control valve 5, the pressure in the EGR passage 4 between the EGR control valve 5 the orifice 6 reduces, approaching the predetermined value.

The VVT valve 13 and the diaphragm assembly 7 repeat the above described operations so that the pressure of the exhaust gases prevailing in the exhaust passage 4 between the EGR control valve 5 and the orifice 6 is maintained substantially constant. The amount of exhaust gases recirculated into the intake manifold 3 is determined, therefore, by the pressure difference between the upstream and downstream of the orifice 6. In other words, the amount of the exhaust gases recirculated is controlled in proportion to the amount of exhaust gases emitted from the engine 1. The above described conventional EGR system has drawbacks as will be discussed hereinbelow.

In the conventional EGR system, the value of the predetermined pressure prevailing in the exhaust gas recirculation passage 4 between the EGR control valve 5 and the orifice 6 is selected to be close to the atmospheric pressure so as to establish a high response in the EGR operation. However, when the engine operates at a low speed, a pulsating variation in pressure of the exhaust gases emitted from the internal combustion engine 1 causes the VVT valve to undesirably operate and therefore, the rate of the exhaust gases recirculated varies undesirably. Because of this undesirable variation in the rate of the recirculation, the engine operation is apt to be unstable while the production rate of NOx (nitrogen oxide) becomes irregular.

In addition to the undesirable operation at a low speed, the conventional EGR system also undesirably operates at a high speed. Since the recirculation rate of the exhaust gases is determined in accordance with the pressure of the exhaust gases, the rate is apt to be higher than required when the engine 1 operates at a high speed with low load. Because of the excessive recirculation of the exhaust gases, the operation of the engine 1 becomes unstable and the fuel consumption rate tends to be high.

Apart from the undesirable operation of the engine 1 at low and high speeds, since the EGR control system operates purely mechanically, the flexibility of design is limited within a relatively narrow range. Because of the limited flexibility of design, it is required to consume a lot of time when manufacturing elements such as the EGR passage 4. Moreover, the VVT valve 13 is required to have a precision so as to be responsive to a very small pressure variation of the exhaust gases in the second chamber 12b. However, since the diaphragm 13d of the VVT valve 13 is exposed to the hot exhaust gases, while the VVT valve 13 receives vibrations from the engine 1, the accuracy and the precision of the diaphragm assembly 13 are deteriorated in a long term use. Therefore, it is substantially impossible to maintain the high responsive characteristic required for an optimal control of the recirculation of the exhaust gases for a long period of time.

The present invention removes the above described drawbacks of the conventional EGR control system. The detailed construction and operation of the EGR system according to the present invention will be described hereinafter in connection with FIG. 2.

Figure 2:
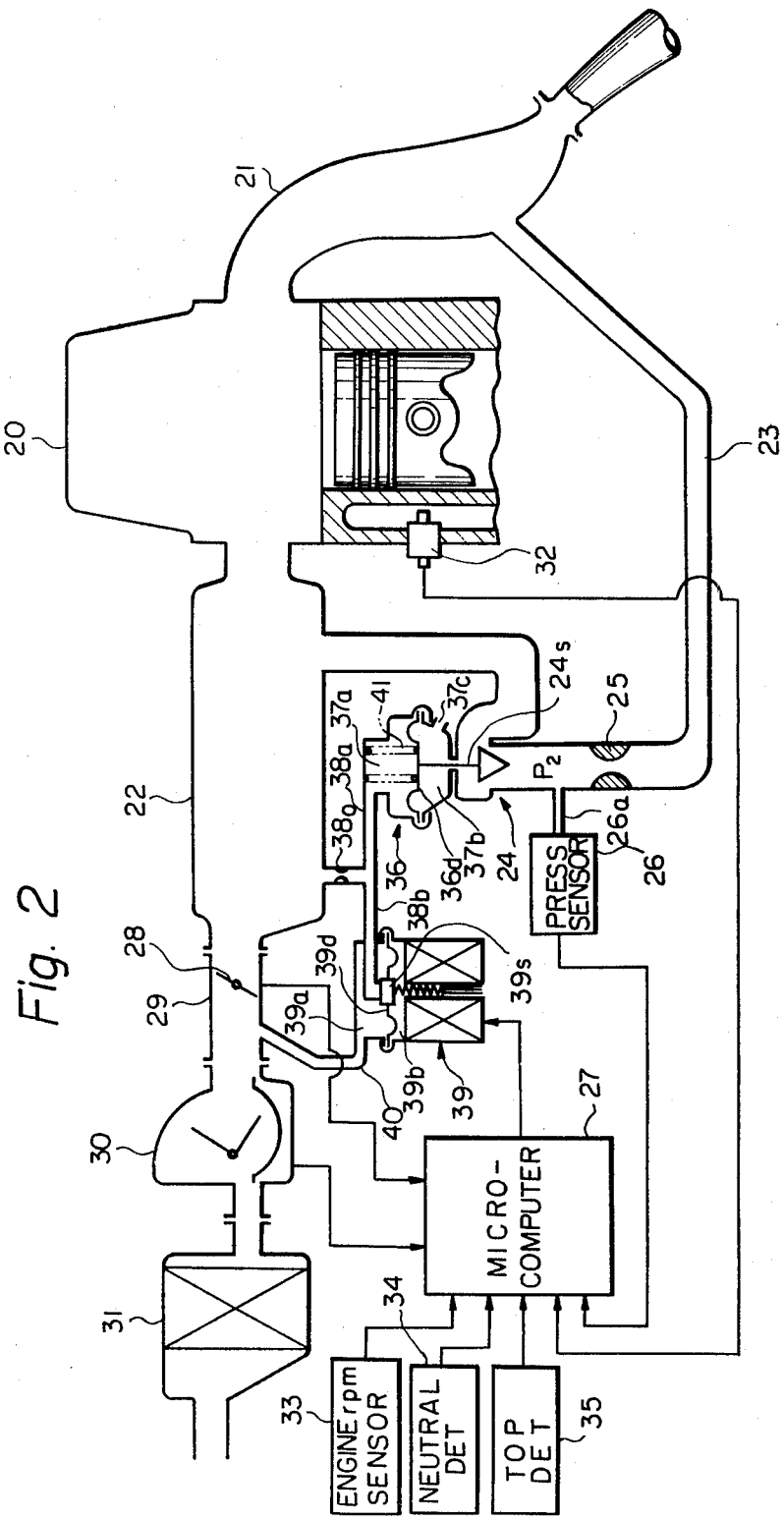
FIG. 2 shows a schematic view of a preferred embodiment of the exhaust gas recirculation system according to the present invention.

FIG. 2 illustrates a schematic view of the EGR system according to the present invention. An internal combustion engine 20 is equipped with an intake manifold 22 and an exhaust gas passage 21. The intake manifold 22 is connected to an intake passage 29 which includes an air cleaner 31, an airflow meter 30 and a throttle valve (flap) 28. The intake air is induced via the air cleaner 31, the airflow meter 30 and the throttle valve 28 into the intake manifold 22. The exhaust gas passage 21 communicates with the atmosphere.

If desired, a suitable catalytic converter (not shown) may be interposed in the exhaust gas passage 21. The exhaust gas passage 21 is connected via an EGR passage 23 to the intake manifold 22. An EGR control valve 24 is interposed in the EGR passage 23 downstream of an orifice 25 which is disposed in the EGR passage 23. The EGR control valve 24 is disposed in the EGR passage 23 so as to control the amount of recirculated exhaust gases. The head of the EGR control valve 24 is fixedly connected to a stem 24s which is arranged to reciprocally move so as to control the opening area of the EGR passage 23. The stem 24s is operatively connected to a diaphragm 36d and the housing (no numeral) of the diaphragm assembly 36 which has first and second chambers 37a and 37b. The first chamber 37a is fluidly communicated with the intake manifold 22 via a passage 38 which has an orifice 38o, while the second chamber 37b communicates with the atmospheric pressure via a port 37c. The diaphragm assembly 36 has a spring 41 in the first chamber for applying a biasing force on the diaphragm 36d.

A pressure sensor 26, such as a semiconductor type sensor, is provided for sensing the pressure "P" in the EGR passage 23 between the orifice 25 and the EGR control valve 24. A conduit 26a is fluidly connected to the EGR passage 23 so as to transmit the pressure in the EGR passage 23 between the orifice 25 and the EGR control valve 24 to the pressure sensor 26. The output of the pressure sensor 26 is connected to an input of a microcomputer 27 which will be described hereinlater.

An electromagnetic valve 39 is provided for controlling the pressure prevailing in the passage 38a. A movable member such as a diaphragm 39d is operatively connected to the armature (no numeral) of the electromagnetic valve 39 and is arranged to move up and down in the figure, in response to an electromagnetic valve energizing signal applied to the electromagnetic valve 39. First and second chamber 39a and 39b are provided in the opposite sides with respect to the diaphragm 39d. The first chamber 39a communicates with the intake passage 29 between the airflow meter 30 and the throttle valve 28 via a passage 40 for inducing atmospheric air therein. The second chamber 39b communicates with the atmospheric pressure via an opening 39c. A conduit 38b is provided for connecting the first chamber 39a of the electromagnetic valve 39 and the passage 38a. The conduit 38b extends in the first chamber 39a and has an opening at the end thereof. The diaphragm 39d has a valve head 39s at the center thereof so that the valve head 39s shuts the opening of the conduit 38b when the diaphragm assumes an upper position. When the diaphragm 39d assumes a lower position, the opening of the conduit 38b is not blocked by the valve 39 and thus the atmospheric pressure prevailing in the first chamber 39a is induced into the conduit 38b. The diaphragm 39d assumes the upper position when the electromagnetic valve 39 is not energized, while the diaphragm 39d assumes the lower position when the electromagnetic valve 39 is energized.

A throttle valve switch (TVsw) (not shown) is operatively connected to the throttle valve 28 and is arranged to produce an output signal when the throttle valve 28 fully closes. In other words, the throttle valve switch turns ON when the opening degree of the throttle valve 28 is below a predetermined value. The output signal of the throttle valve switch is transmitted to an input of the microcomputer 27. The airflow meter 30 has a potentiometer (not shown) which produces an output signal indicative of the flow rate "Q" of the intake air induced via the intake passage 29 to the internal combustion engine 20. The output signal of the airflow meter 30 is also transmitted to an input of the microcomputer 27. An engine rpm sensor 33 which produces an output signal indicative of the rotational speed "N" of the crankshaft of the engine 20 is provided for transmitting the output signal to an input of the microcomputer 27. A neutral detector 34 and a top gear detector 35 are provided for detecting the gear position of the transmission connected to the engine. The neutral detector 34 produces an output signal only when the gear of the transmission is in neutral, while the top gear detector 35 produces an output signal only when the gear is in top. The output signals of the neutral detector 34 and the top gear detector 35 are respectively supplied to inputs of the microcomputer 27.

A temperature sensor 32 is disposed in the engine housing so as to be exposed to the engine coolant. The temperature sensor 32 produces an output signal indicative of the engine temperature and the output signal is transmitted to an input of the microcomputer 27. It will be understood that the microcomputer 27 produces an output signal which is used as an electromagnetic valve energizing signal. The voltage of the output signal of the microcomputer 27 is controlled in accordance with the above mentioned various parameters so that the electromagnetic valve 39 is controlled accordingly.

It will be further described how the microcomputer 27 controls the electromagnetic valve 39 in accordance with the above mentioned various engine parameters.

Figure 3:
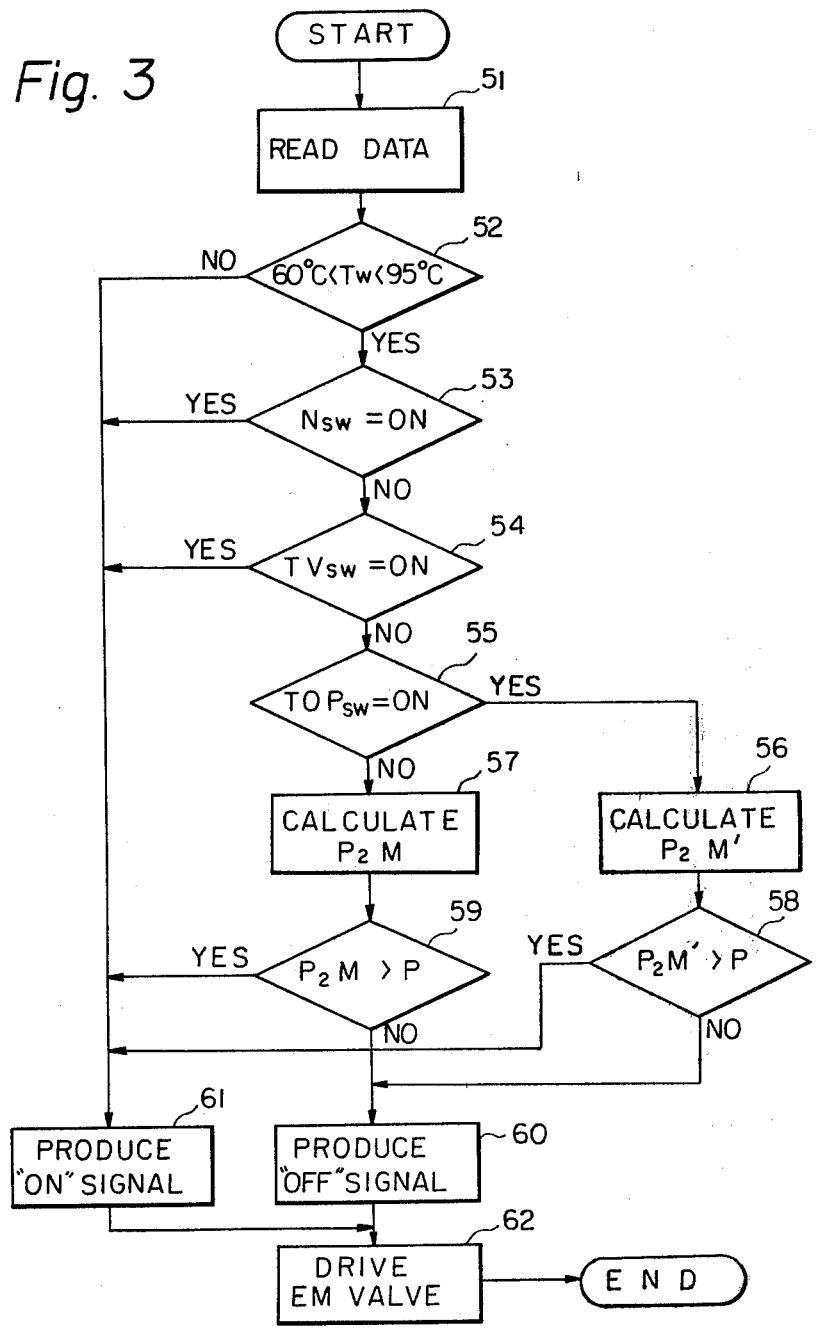
FIG. 3 and FIG. 4 show flowcharts of the operating process of the microcomputer shown in FIG. 2.

FIG. 3 illustrates the first flowchart of the operating process of the microcomputer 27. The operating process of the microcomputer 27 has twelve steps as will be described hereinbelow. When the operation of the microcomputer has started, the microcomputer 27 reads all of the input data, i.e. the aforementioned various engine parameters which are respectively stored in a memory unit (not shown) included in the microcomputer 27 (first step 51). Upon receipt of the data, the microcomputer 27 operates various comparison steps and calculation steps. First of all, a second step 52 follows the first step 51, where it is detected whether the engine temperature Tw is within a normal range. For instance, it is detected whether the engine (coolant) temperature Tw measured by the temperature sensor 32, is between 60° C. and 95° C. If the temperature is out of the normal range, the answer of the second step 52 is NO, while if the temperature is within the normal range, the answer of the same is YES. In case that the answer of the second step 52 is YES, the third step 53 starts. In the third step 53, it is detected whether the transmission is in neutral or not. If the transmission is in neutral, the answer of the third step 53 is YES, while if the transmission is not in neutral, the answer of the third step 53 is NO. When the answer of the third step 53 is NO, the fourth step 54 follows. In the fourth step 54, it is detected whether the throttle valve 28 is fully closed or not. If the throttle valve is fully closed, i.e. the throttle valve switch (TVsw) is ON, the answer of the fourth step 54 is YES, while if the throttle valve 28 is not fully closed, the answer of the fourth step 54 is NO. When the answer of the fourth step 54 is NO, the fifth step 55 starts. In the fifth step 55, it is detected whether the top gear is engaged or not. If the transmission is in top gear, i.e. the top gear switch (TOP sw) is ON, the answer of the fifth step 55 is YES, while if the transmission is not in top gear, the answer of the same is NO.

Two calculation steps, i.e. the sixth and seventh steps 56 and 57 start upon presence of answers of the fifth step 55. Namely, when the answer of the fifth step 55 is YES, the sixth step (first calculation step) 56 starts, while the seventh step (second calculation step) 57 starts when the answer of the fifth step 55 is NO. In each of the sixth and seventh steps 56 and 57, a value corresponding to an optimal pressure of the recirculating exhaust gases is calculated based on the engine speed "N" and the airflow rate "Q" respectively supplied from the engine rpm detector 33 and the airflow meter 30. A detailed description of the method for deriving the optimal pressure will be made hereinlater. A calculated value derived from the sixth step is expressed in terms of $P_2M'$, while a calculated value derived from the seventh step is expressed in terms of $P_2M$.

These calculated values $P_2M'$ and $P_2M$ which are respectively indicative of optimal pressures of the exhaust gases between the EGR control valve 24 and the orifice 25 for respective conditions, i.e. with top gear or without top gear. These calculated values $P_2M'$ and $P_2M$ are respectively used in the following eighth and ninth steps 58 and 59.

In the eighth and ninth steps 58 and 59, the actual pressure P measured by the pressure sensor 26 is compared with one of the optimal values $P_2M'$ and $P_2M$. This means that the optimal values $P_2M'$ and $P_2m$ are used in the eighth and ninth steps 58 and 59 as reference values for the comparison. The answer of the eighth step 58 is YES when the reference value $P_2M'$ is over the actual pressure P, while the answer of the same step is NO, when the reference value $P_2M'$ is below the actual value P. In the same manner, the answer of the ninth step 59 is YES when the reference value $P_2M$ is over the actual pressure P, while the answer of the same step is NO, when the reference value $P_2m$ is below the actual value P.

The following tenth and eleventh steps 60 and 61 respectively start in response to various answers of the second, third, fourth, eighth and ninth steps 52, 53, 54, 58 and 59. The tenth step 60 starts when the answer of the eighth or ninth step is NO. In the tenth step 60, an "OFF" signal is produced where the OFF signal is used in the following twelfth step 62. On the other hand, if the answer of the second step 52 is NO, or one of the answers of the third, fourth, eighth and ninth steps 53, 54, 58 and 59 is YES, the eleventh step 61 starts. In the eleventh step 61, an "ON" signal is produced where the ON signal is used in the following twelfth step 62.

The twelfth step 62 is provided for producing an electromagnetic valve energizing signal which is applied to the electromagnetic valve 39 shown in FIG. 2. Upon presence of the ON signal, a direct current of a predetermined voltage is applied to the electromagnetic valve 39 so as to energize the same. On the contrary, upon presence of the OFF signal, no valve energizing signal is applied to the valve 39 and thus the electromagnetic valve 39 is deenergized.

It will be described how to obtain the above mentioned optimal pressure hereinbelow. As described hereinbefore, the rotational speed N of the crankshaft of the engine 20 and the intake airflow rate Q are respectively detected and the detected values are stored in the memory unit of the microcomputer 27. The stored information is read out in the first step 51 and are used in the sixth or seventh step 56 or 57. Although the values obtained via the sixth and seventh steps are different from each other, the process of calculations is the same. Therefore, only the calculation in the sixth step 56 is described.

The memory of the microcomputer 27 is pre-written with a number of values indicative of the optimal pressures for respective engine speed and the airflow rate per a single rotation of the engine. The airflow rate per a single rotation of the engine indicated by a reference Q/N is obtained by dividing the intake airflow rate Q by the engine speed N. A table which is used in a table look up method is made by arranging the above mentioned number of values corresponding to optimal pressures. For instance, the operational range of the rotational speed N of the engine 20 is divided by a suitable number such as 16, while the range of the values Q/N is divided by the same number. Therefore 16 engine speeds and 16 airflow rates per a single rotation of the engine 20 are obtaines. The 16 engine speeds are placed along the abscissa of the table, while the 16 airflow rates per a single rotation of the engine 20 are placed along the ordinate of the table. It will be understood that $256(16 \times 16)$ values indicative of optimal pressures are arranged in the table.

In the sixth step 56, the value of Q/N is calculated first upon receipt of the engine speed N and the airflow rate Q. In accordance with the values of the N and Q/N a corresponding value indicative of the optimal pressure is picked up (selected) from the table by the well known table look up method. If one of the values N and Q/N does not correspond with any of the values along the abscissa and/or the ordinate of the table, the well known interpolation method is used to ascertain an approximate value. It will be understood that in the sixth and seventh steps 56 and 57 first and second pressures $P_2M'$ and $P_2M$ are respectively calculated. These first and second pressures are optimal for the respective engine operational conditions, i.e. at top gear and other than top gear. Since a high recirculation rate of the exhaust gases is not required when the transmission is in the top gear, in which the load of the engine is relatively low, it is advantageous to reduce the recirculation rate to some extent. Therefore, the value of $P_2M'$ is smaller than the value of $P_2M$ when the engine speed N and the intake airflow rate Q are respectively constant.

It will be seen from the foregoing, that the microcomputer 27 produces an output signal which is used as an electromagnetic valve energizing signal. When the electromagnetic valve 39 is not energized upon absence of the output signal of the microcomputer 27, the valve 39 remains closed as shown in FIG. 2. Therefore, the communication between the conduit 38b and the other conduit 40 is blocked so that the vacuum pressure prevailing in the intake manifold 22 is directly induced into the first chamber 37a of the diaphragm assembly 36. Upon reception of the vacuum pressure in the first chamber 37a, the diaphragm 36d moves upward in the figure so as to open the EGR control valve 24. Consequently, the exhaust gases upstream of the valve 24 are induced into the intake manifold 22. As the exhaust gases flow via the EGR passage 23 into the intake manifold 22, the pressure in the EGR passage 23 between the valve 24 and the orifice 25 decreases and thus the decrease in pressure is detected by the pressure sensor 26. In case that the actual pressure P falls below the first reference value $P_2M'$ when the transmission is in top gear, an ON signal is produced in the eleventh step 61 and thus the electromagnetic valve energizing signal is applied to the electromagnetic valve 39. In the same manner when the transmission is in other than top gear, and when the actual pressure P is below the second reference value $P_2M$, an ON signal is produced and thus the electromagnetic valve 39 is energized.

Upon energization of the electromagnetic valve 39, the valve head 39d moves downward in the figure, and thus the conduit 38b communicates with the other conduit 40 so that the vacuum pressure in the first chamber 37a of the diaphragm assembly 36 is diluted by the atmospheric air induced via the conduits 40 and 38b. This means that the pressure in the first chamber 37a approaches the other pressure prevailing in the second chamber 37b, which is maintained at the atmospheric pressure. Therefore, the diaphragm 36d moves downward by the force of the spring 41 and thus the EGR control valve 24 blocks the EGR passage 23. Upon closure of the EGR control valve 24, no exhaust gas is recirculated into the intake manifold 22, while the pressure P of the exhaust gases between the EGR control valve 24 and the orifice 25 increases.

When the pressure P increases and exceeds the reference value, the answer of the eighth or ninth step 58 or 59 becomes YES again and thus the same operation mentioned hereinabove is repeated. It will be understood that the electromagnetic valve 39 is repeatedly energized and deenergized by the output signal of the microcomputer 27. It will be further understood that EGR operation is not performed when the engine temperature Tw is below a predetermined value, such as 60° C. or over a predetermined value, such as 95° C. Of course, as described hereinabove, when the gear position of the transmission is in neutral (viz. no load), or when the throttle valve 28 is fully closed, the EGR operation is not performed since such an EGR operation is not required or EGR operation is disadvantageous for the engine operation.

It will be understood that the EGR control system including the EGR control valve 24, operated by the diaphragm assembly 36, the electromagnetic valve 39, the pressure sensor 26, and the microcomputer 27 functions as a feedback circuit. With the ON and OFF operations of the electromagnetic valve 39, the pressure in the EGR passage 23 between the valve 24 and the orifice 25 is controlled to be maintained constant. It will be understood that the repetition frequency of the ON and OFF operations of the electromagnetic valve 39 is determined by mechanical factors, such as the diameter of the passage 40 which induces the atmospheric pressure into the first chamber 39a of the electromagnetic valve 39. According to experiments, when the repetition frequency of the ON and OFF operations of the electromagnetic valve 39 is between 10 and 20 Hz, a desirable control of the recirculation of the exhaust gases is achieved. Therefore, it is preferable to select the response characteristics of various elements constituting the EGR control system so as to set the repetition frequency between 10 and 20 Hz.

Although in the above described operation of the EGR control system, the frequency of the valve energizing signal, i.e. the output signal of the microcomputer 27, is determined by the response characteristic of the various elements constituting the EGR system, it is possible to control the EGR system with a valve energizing signal having a predetermined constant frequency. To perform such a control a pulse signal the pulse width of which is controlled by pulse width modulation, is used.

Figure 4:
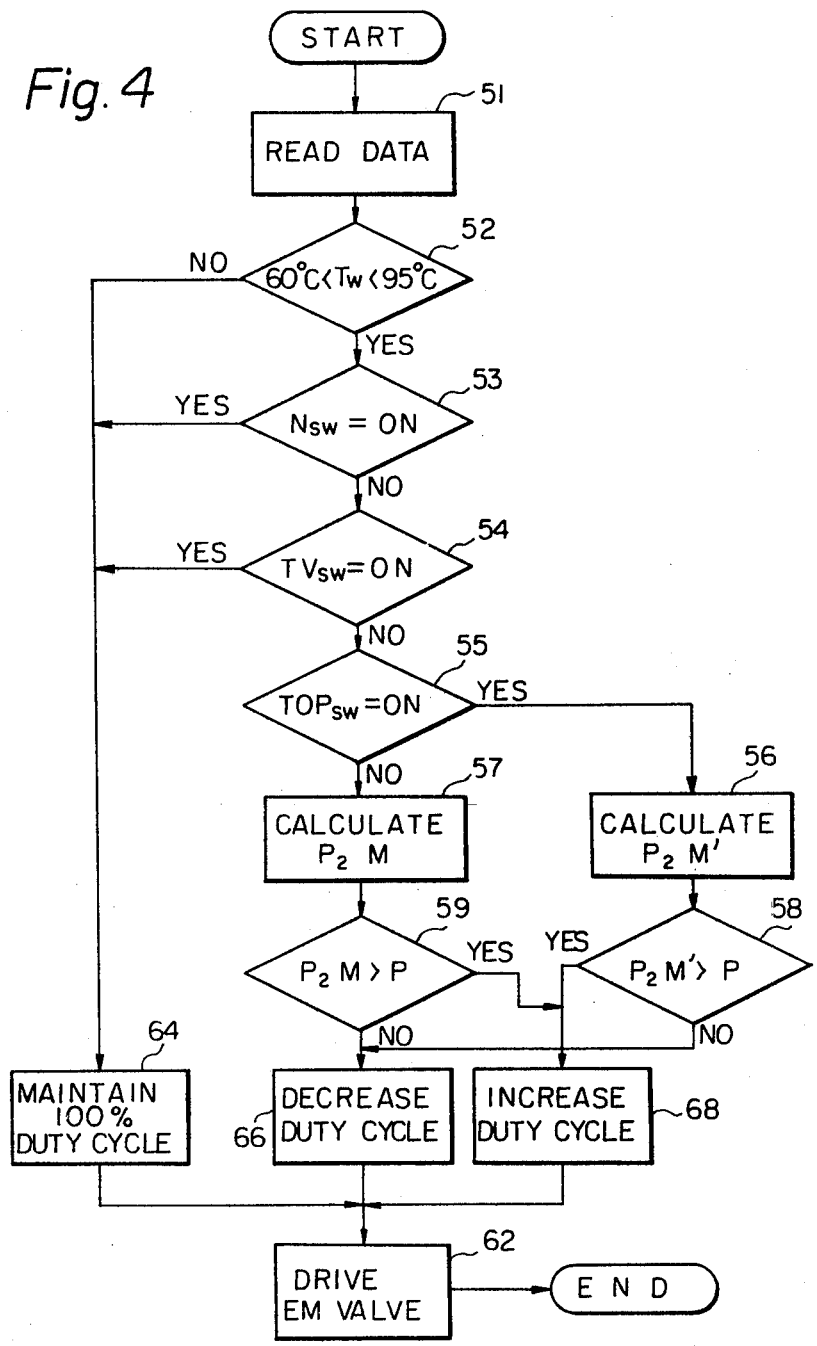

Hence, reference is now made to FIG. 4 which shows another flowchart of the operating process of the microcomputer shown in FIG. 2. The steps shown in FIG. 4 are the same as the steps shown in FIG. 3 as far as the ninth step 59. When the answer of the eighth or ninth step 58 or 59 is NO, a step 66 starts in which the duty cycle of the pulse signal is decreased. On the other hand, when the answer of the eighth or ninth step 58 or 59 is YES, another step 68 starts, in which the duty cycle of the pulse signal is increased. If the answer of the first step 52 is NO, or the answer of the second or third step 53 or 54 is YES, a step 64 starts, in which the duty cycle of the pulse signal is maintained at 100%. Via one of these steps 64, 66 and 68 the twelfth step 62 starts to energize the electromagnetic valve 39 by a pulse signal the pulse width of which is controlled by the above mentioned steps. According to experiments, when the frequency of the pulse signal is set at a predetermined value within a range from 20 to 60 Hz, practical control of the exhaust gas recirculation ratio is obtained.

Obviously many modifications and variations of the present invention are possible in the light of the above teachings. It is, therefore, to be understood that within the scope of the appended claims the invention may be practiced otherwise than as specifically described.

What is claimed is:

1. An exhaust gas recirculation system controlled by a microcomputer, for an internal combustion engine in a vehicle having at least two gears one of which is a top gear, said system comprising:
   (a) an exhaust gas recirculation passage interposed between an exhaust pipe and an intake manifold of said internal combustion engine, said exhaust gas recirculation passage having an orifice;
   (b) an exhaust gas recirculation control valve disposed in said exhaust gas recirculation passage downstream of said orifice;
   (c) first means for controlling said exhaust gas recirculation control valve in accordance with an electrical signal;
   (d) second means for producing a signal indicative of the pressure of the exhaust gases in said exhaust gas passage between said exhaust gas recirculation control valve and said orifice;
   (e) third means for sensing the operational condition of said engine;
   (f) fourth means for sensing whether said vehicle is in said top gear or not; and
   (g) fifth means responsive to said fourth means for producing said electrical signal with which said first means is controlled, said fifth means producing said signal in accordance with the pressure sensed by said second means and a value derived from one of two look-up tables, one table corresponding to the optimum pressure value of said vehicle in top gear and the other table corresponding to an optimum pressure value for the vehicle not in top gear, said pressure value within a look-up table being determined by said third means.

2. An exhaust gas recirculation system as claimed in claim 1, wherein said first means comprises a first diaphragm assembly operatively connected to said exhaust gas recirculation control valve, and an electromagnetic valve operatively connected to said diaphragm assembly.

3. An exhaust gas recirculation system as claimed in claim 2, wherein said diaphragm assembly comprises first and second chambers arranged in opposite side with respect to a diaphragm therebetween, which is operatively connected to said exhaust gas recirculation control valve, and means for biasing said diaphragm in a direction to cause said exhaust gas recirculation control valve to close, said first chamber communicating with the intake manifold of said engine, while said second chamber communicates with the atmospheric pressure.

4. An exhaust gas recirculation system as claimed in claim 1, wherein said second means comprises a semiconductor type pressure sensor for producing an output signal indicative of the pressure of the exhaust gases in said exhaust gas recirculation passage between said exhaust gas recirculation control valve and said orifice.

5. An exhaust gas recirculation system as claimed in claim 1, wherein said third means comprises means for producing an output signal indicative of the rotational speed of said engine, and means for producing an output signal indicative of the flow rate of the intake air of said engine.

6. An exhaust gas recirculation system as claimed in claim 1, wherein said fourth means comprises a neutral detector and a top gear detector which are respectively connected to a transmission in said vehicle.

7. An exhaust gas recirculation system as claimed in claim 1, further comprising means for producing an output signal indicative of the engine temperature.

8. A method for controlling an exhaust gas recirculation system, for an internal combustion engine, said system including an exhaust gas recirculation passage interposed between an exhaust pipe and an intake manifold of said engine, said exhaust gas passage having an orifice; an exhaust gas recirculation control valve disposed in said exhaust gas recirculation passage downstream of said orifice; first means for controlling said exhaust gas recirculation control valve in accordance with an electrical signal; and second means for producing a signal indicative of the actual pressure of the exhaust gases in said exhaust gas passage between said exhaust gas recirculation control valve and said orifice; comprising the steps of:
  (a) detecting whether the temperature of said engine is within a normal range or not;
  (b) detecting whether the transmission connected to said engine is in neutral or not when the engine temperature is within said normal range;
  (c) detecting whether the throttle valve of said engine is fully closed or not when said transmission is in other than neutral;
  (d) detecting whether said transmission is in top gear or not when the throttle valve is open;
  (e) finding a first optimal reference pressure by means of the table look up method and the interpolation method in accordance with the rotational speed of said engine and the flow rate of the intake air of said engine when said transmission is in top gear;
  (f) finding a second optimal reference pressure by means of the table look up method and the interpolation method in accordance with the rotational speed of said engine and the flow rate of the intake air of said engine when said transmission is in other than top gear;
  (g) comparing said actual pressure with said first optimal reference pressure when said first optimal reference pressure is found;
  (h) comparing said actual pressure with said second optimal reference pressure when said second optimal reference pressure is found;
  (i) producing a first signal when said actual pressure is higher than said first optimal reference pressure or when said actual pressure is higher than said second optimal reference pressure;
  (j) producing a second signal when said engine temperature is out of said normal range, when said transmission is in neutral, when said throttle valve is fully closed, when said actual pressure is below said first optimal reference pressure or when said actual pressure is below said second optimal reference pressure; and
  (k) producing said electrical signal with which said first means is controlled, said electrical signal assuming first and second voltages in accordance with said first and second signals.

9. A method for controlling an exhaust gas recirculation system, for an internal combustion engine, said system including an exhaust gas recirculation passage interposed between an exhaust pipe and an intake manifold of said engine, said exhaust gas passage having an orifice; an exhaust gas recirculation control valve disposed in said exhaust gas recirculation passage downstream of said orifice; first means for controlling said exhaust gas recirculation control valve in accordance with a pulse signal; and second means for producing a signal indicative of the actual pressure of the exhaust gases in said exhaust gas passage between said exhaust gas recirculation control valve and said orifice; comprising the steps of:
  (a) detecting whether the temperature of said engine is within a normal range or not;
  (b) detecting whether the transmission connected to said engine is in neutral or not when the engine temperature is within said normal range;
  (c) detecting whether the throttle valve of said engine is fully closed or not when said transmission is in other than neutral;
  (d) detecting whether said transmission is in top gear or not when the throttle valve is open;
  (e) finding a first optimal reference pressure by means of the table look up method and the interpolation method in accordance with the rotational speed of said engine and the flow rate of the intake air of said engine when said transmission is in top gear;
  (f) finding a second optimal reference pressure by means of the table look up method and the interpolation method in accordance with the rotational speed of said engine and the flow rate of the intake air of said engine when said transmission is in other than top gear;
  (g) comparing said actual pressure with said first optimal reference pressure when said first optimal reference pressure is found;
  (h) comparing said actual pressure with said second optimal reference pressure when said second optimal reference pressure is found;
  (i) producing a first signal when said actual pressure is higher than said first optimal reference pressure or when said actual pressure is higher than said second optimal reference pressure;
  (j) producing a second signal when said actual pressure is below said first optimal reference pressure or when said actual pressure is below said second optimal reference pressure;
  (k) producing a third signal when said engine temperature is out of said normal range, when said transmission is in neutral, or when said throttle valve is fully closed; and
  (l) producing said pulse signal with which said first means is controlled, the duty cycle of said pulse signal being increased upon presence of said first signal and decreased upon presence of said second signal, the duty cycle of said pulse signal being maintained at 100 percent upon presence of said third signal.

10. A method for controlling an exhaust gas recirculation system for an internal combustion engine which is mounted in a vehicle having a transmission, said transmission having at least two gears one of which is a top gear, said system including an exhaust gas recirculation passage interposed between an exhaust pipe and an intake manifold of said engine, said exhaust gas passage having an orifice; said recirculation system including an exhaust gas recirculation control valve disposed in said exhaust gas recirculation passage downstream of said orifice, said recirculation system further including first means for controlling said exhaust gas recirculation control valve in accordance with an electrical signal and second means for producing a signal indicative of the actual pressure of exhaust gases in said exhaust gas passage between said exhaust gas recirculation control valve and said orifice said system including a microcomputer having at least two look-up tables including values of optimum exhaust gas pressure based upon engine operating conditions, said method comprising the steps of:
  (a) detecting whether said transmission is in top gear or not;
  (b) depending upon whether said transmission is in said top gear or not, reading an optimum exhaust gas pressure value by means of the table look-up method and the interpolation method utilizing one or the other of said tables in accordance with the engine operating conditions;
  (c) comparing said optimum exhaust gas pressure with said actual exhaust gas pressure; and (d) producing an electrical signal to control said first means for controlling said exhaust gas recirculation control valve.

11. An exhaust gas recirculation system for an internal combustion engine, said engine located in a vehicle having a transmission with at least two gears, one of which is a top gear, said system comprising:

(a) an exhaust gas recirculation passage interposed between an exhaust pipe and an intake manifold of said internal combustion engine, said exhaust gas recirculation passage having an orifice;

(b) an exhaust gas recirculation control valve, disposed in said exhaust gas recirculation passage downstream of said orifice;

(c) first means for controlling said exhaust gas recirculation control valve in accordance with an electrical signal;

(d) second means for producing the signal indicative of the pressure of the exhaust gases in said exhaust gas passage between said exhaust gas recirculation control valve and said orifice;

(e) first look-up means for generating an exhaust gas pressure reference output based on at least two engine operating parameters, said parameters other than exhaust gas recirculation upstream pressure, when said transmission is in said top gear;

(f) second look-up means for generating an exhaust gas reference pressure output based on said two engine operation parameters when said transmission is not in said top gear; and (g) means for comparing the actual exhaust gas pressure valve from said second means with an exhaust gas pressure reference output from one of said first and second look-up means dependent upon whether said transmission is in said top gear or not, said means for comparing providing an electrical signal to said first means for controlling.

* * * * *